United States Patent

Boberski et al.

[11] Patent Number: 5,556,815
[45] Date of Patent: Sep. 17, 1996

[54] HIGH TEMPERATURE RESISTANT SILICON NITRIDE CERAMIC

[75] Inventors: Cornelia Boberski, Liederbach; Hartmut Krüner, Eppstein/Taunus; Günter Riedel, Kelkheim/Taunus; Rainer Hamminger, Mannheim, all of Germany

[73] Assignee: Hoechst Aktiengesellschaft, Frankfurt am Main, Germany

[21] Appl. No.: 534,059

[22] Filed: Sep. 26, 1995

Related U.S. Application Data

[63] Continuation of Ser. No. 170,921, Dec. 21, 1993, abandoned.

[30] Foreign Application Priority Data

Dec. 23, 1992 [DE] Germany ............ 42 43 743.1

[51] Int. Cl.⁶ .................................. C04B 35/587
[52] U.S. Cl. .................................. 501/97; 501/98
[58] Field of Search .......................... 501/97, 98

[56] References Cited

U.S. PATENT DOCUMENTS

| | | | |
|---|---|---|---|
| 4,327,187 | 4/1982 | Komatsu et al. | 501/98 X |
| 4,412,009 | 10/1983 | Komatsu et al. | 501/97 |
| 4,769,350 | 9/1988 | Nishioka et al. | 501/97 X |
| 4,902,653 | 2/1990 | Komatsu et al. | 501/97 |
| 5,017,530 | 5/1991 | Arakawa et al. | 501/97 X |
| 5,089,448 | 2/1992 | Kawakami et al. | 501/97 |
| 5,098,872 | 3/1992 | Suyama et al. | 501/97 |
| 5,401,450 | 3/1995 | Mitomo et al. | 501/97 |
| 5,424,256 | 6/1995 | Yoshimura et al. | 501/97 |

FOREIGN PATENT DOCUMENTS

| | | |
|---|---|---|
| 0015421 | 9/1980 | European Pat. Off. |
| 0197548 | 10/1986 | European Pat. Off. |
| 0227471 | 7/1987 | European Pat. Off. |
| 56-53574 | 12/1981 | Japan. |
| 59-18165 | 1/1984 | Japan. |

OTHER PUBLICATIONS

Cornelia Boberski, et al. Mechanical Properties of Gas Pressure Sintered Silicon Nitride, Proc. 4, Int. Symp. Ceram. Mater. Components for Engines, Amsterdam 1991. (preprint) No Month.

*Primary Examiner*—Karl Group
*Attorney, Agent, or Firm*—Foley & Lardner

[57] ABSTRACT

A shaped part of sintered silicon nitride has high mechanical strength and comprises at least 87% by weight of silicon nitride and up to 13% by weight of an additive combination of $Al_2O_3$ and $Y_2O_3$. The $Y_2O_3/Al_2O_3$ weight ratio is in the range of from 1.1 to 3.4. It can additionally contain $HfO_2$ and/or $ZrO_2$ in amounts of up to 1.0% by weight.

The shaped part has a density of 98% of the theoretical maximum density, a mechanical strength of $\geq 850$ MPa at room temperature and a mechanical strength of $\geq 800$ MPa at a temperature of 800° C. Its fracture toughness $K_{IC}$ is in the range $\geq 8$ MPa·$\sqrt{m}$.

15 Claims, No Drawings

HIGH TEMPERATURE RESISTANT SILICON NITRIDE CERAMIC

This application is a continuation of application Ser. No. 08/170,921, filed Dec. 21, 1993 now abandoned.

FIELD OF THE INVENTION

The present invention relates to shaped parts of sintered silicon nitride ceramic which have high strength both at room temperature and at high temperatures and which contain $Si_3N_4$ in the crystalline phases of the α and/or β forms.

DESCRIPTION OF RELATED ART

Silicon nitride and components produced therefrom by sintering have already been described in numerous publications. From JP-A-59/18165 it is known, for example, that a mixture of $Si_3N_4$ with $Y_2O_3$ and $Al_2O_3$ in a weight ratio of 94 to 3 to 3 can be sintered under gas pressure at temperatures above 1900° C. and that high strengths at room temperature can thus be achieved. The weight ratio of $Y_2O_3$ to $Al_2O_3$ according to this publication is 1; however, in the case of production via a two-stage pressure sintering cycle at very high temperatures between 1900° and 1950° C. in combination with a very long sintering time of a total of 4 hours, this leads however to a microstructure which is too coarse in respect of its crystallite size to still be suitable for specific applications in high performance technology.

From JP-A-63/139057 it is known that $Al_2O_3$ and $Y_2O_3$ in a ratio of 1:1 can be admixed with silicon nitride (5% by weight and 5% by weight), but the presence of aluminum nitride in an amount of 2.1% by weight as additionally required according to this publication leads to the formation of sialons, which impairs the technical properties, in particular the strength, of the silicon nitride parts.

EP-A-197 548 discloses that from 0.5 to 4% by weight of $Al_2O_3$ and from 4 to 8% by weight of $Y_2O_3$ can be used as additives to silicon nitride without needing to adhere to a particular weight ratio of the two additives. According to this publication, however, only from 85 to 97% of the theoretically possible density is achieved in the shaped parts.

The presence of $HfO_2$ as an additive in silicon nitride is known from a further Japanese publication JP-A-31/53574. According to this publication, however, the $HfO_2$ combines with yttrium to give $Y_2Hf_2O_7$.

SUMMARY OF THE INVENTION

It is an object of the present invention to provide an additive combination which makes it possible to further improve the strength properties of sintered shaped parts of silicon nitride at room temperature and simultaneously also at temperatures above 800° C., and to provide a corresponding production process for components of silicon nitride having exceptional high-temperature strength.

This object is achieved by shaped parts of the generic type mentioned in the introduction, the characteristic features of which are that they comprise at least 87% by weight of silicon nitride and up to 13% by weight of an additive combination of $Al_2O_3$ and $Y_2O_3$, the $Y_2O_3/Al_2O_3$ weight ratio being in the range of from 1.1 to 3.4, that they additionally contain from 0 to 1.0% by weight of $HfO_2$ and/or $ZrO_2$, that the shaped parts have a density of greater than 98% of the theoretically possible density and that they have a flexural strength of >850 MPa at room temperature and of ≧800 MPa at a temperature of 800° C.

DETAILED DESCRIPTION

Contrary to the general view, it has been possible to show that shaped parts of $Si_3N_4$ ceramic having relatively high $Al_2O_3$ contents can be produced without the glass phase crystallizing out and have good strength both at room temperature and also at elevated service temperatures with a simultaneously high fracture toughness. In accordance with the invention this is achieved by components of $HfO_2$ and/or $ZrO_2$ in the amorphous phase and/or the setting of suitable $Y_2O_3/Al_2O_3$ ratios. The materials dissolved in the amorphous phase raise the transition temperature $T_G$ of the amorphous phase and/or its viscosity-temperature behavior above $T_G$ is favorably affected in the direction of higher strengths of the shaped parts at high temperatures.

The microstructure of a $Si_3N_4$ ceramic is made up of rod-shaped $Si_3N_4$ crystals and the grain boundary phase. The crystals are normally present in a disordered, purely random arrangement which is described as isotropic microstructure. For characterization of the microstructure test pieces are ground, etched and then optically examined with a scanning electron microscope to produce photographs at magnifications of 5000 and 10,000. The photographs are then evaluated semi-automatically. For each test piece about 800 to 1500 grains must be evaluated, in each case the longest diagonal of a grain being defined as the grain length L and the shortest diagonal being defined as the grain width W. The aspect ratio A is the ratio of L to W. To determine the aspect ratio at least 40 grains per test piece having grain edges as close to parallel as possible and grain lengths as long as possible are selected, so as to level out the influence of the sectioning effect.

The shaped parts of the invention preferably possess a microstructure which has a fine grain arrangement of silicon nitride having more than 3.106 grains/mm² with an average width of the silicon nitride crystallites of less than 0.4 μm, a maximum grain width of at most 2 μm and an aspect ratio of greater than 8 within a finely divided amorphous phase, the amorphous grain boundary phase between the $Si_3N_4$ grains being no thicker than 0.1 μm.

The fracture toughness $K_{IC}$ of the shaped parts of the invention is preferably greater than 9 MPa·√m, their mechanical flexural breaking strength (4 point bend test in accordance with DIN 51 110) at room temperature is greater than 950 MPa and their mechanical flexural breaking strength above 800° C. is greater than 800 MPa. Because of the high sintered bulk density of ≧98% of the theoretically possible density the modulus of elasticity is in the range of from 290 to 320 GPa. With the relatively low coefficient of thermal expansion of $3.1 \cdot 10^{-6}$/K and a thermal conductivity of 20 W/m·K the shaped parts of the invention possess good thermal shock resistance, quantified by a critical temperature difference of ≧800K.

The components of the invention are particularly suitable for use in machine and plant construction and as valves in combustion engines for automobiles. In the process for producing the shaped parts of silicon nitride according to the invention, a mixture of $Si_3N4$ having a specific surface area of from 2 to 15 m²/g, an $O_2$ content of <1.5% by weight and a proportion of β form of <2% by volume with finely divided $Y_2O_3$, $Al_2O_3$ or $HfO_2$ and/or $ZrO_2$ is first prepared. The total additive content should, according to the invention, be between 5 and 13% by weight, based on the total weight of the mixture. In particular, the additive content should be in the range of from 8 to 10% by weight. The mixture is then mixed and milled in a liquid dispersion medium (water or organic solvent) and the suspension so produced is dried and agglomerated in, for example, a spray dryer. The agglomerated material obtained is then made into shaped parts by pressing, injection molding or redispersing and casting and then sintering under gas pressure at temperatures between 1725° and 1850° C. and at $N_2$ pressures between 2 and 8 MPa over a period of up to 2 h.

The examples below are intended to illustrate the invention in more detail for those skilled in the art, without however limiting it to the particular embodiments.

Examples 1 and 2 (comparative examples)

Powder mixtures of 87.7% by weight of $Si_3N_4$ (98% of $\alpha$-$Si_3N_4$ and 2% of $\beta$ from; $O_2$ content <1.5% by weight, BET specific surface area=11 m²/g), 2.3% by weight of $Al_2O_3$ and 10% by weight of $Y_2O_3$ were prepared. This corresponds to a total additive content of 12.3% by weight and a $Y_2O_3$:$Al_2O_3$ weight ratio of 4.35. These mixtures were intensively mixed and milled in batches of 400 g in an agitated ball mill using $Al_2O_3$ milling media and isopropanol as dispersion medium for a period of 2 h. The suspension was dried in a rotary evaporator and subsequently sieved through a sieve having a mesh size of 250 μm. The powders were subsequently isostatically pressed at 300 MPa to give compacts.

In Example 1, sintering was carried out without pressure in a 0.1 MPa $N_2$ atmosphere by raising the temperature to 1800° C. over a period of one hour, maintaining it at this value for one hour and then cooling back down to room temperature over a further three hours.

In Example 2, sintering was carried out under a gas pressure of 2 MPa over a period of 30 min. The results of Examples 1 and 2 are shown in Table 1. The use of gas pressure has improved the high-temperature strengths. The high-temperature strengths of both samples were below 700 MPa with a relatively high fracture toughness of $K_{IC}$=9.2 and 10.1 MPa·√m respectively.

Examples 3 to 5

Powder mixtures of 87.7% by weight of $Si_3N_4$ (98% of $\alpha$-$Si_3N_4$ and 2% of $\beta$ form; $O_2$ content <1.5% by weight, BET=11 m²/g) were prepared with various total contents of sintering additives and various $Y_2O_3$:$Al_2O_3$ ratios.

|  | Total additives | $Y_2O_3$:$Al_2O_3$ |
| --- | --- | --- |
| Example 2 (comparative example) | 12.3 | 4.35 |
| Example 3 | 10.00 | 3.5 |
| Example 4 (invention) | 8.00 | 2.0 |
| Example 5 | 6.00 | 1.0 |

As described in connection with Example 1, the samples were mixed, milled, dried and made into shaped parts and sintered under gas pressure. The results are summarized in Table 2.

Sufficiently good compaction was obtained only in Examples 4 and 2, with Example 4 corresponding to the invention and being distinguished from Example 2 (comparative example according to the prior art as described by Boberski et al., Mechanical Properties of Gas Pressure Sintered Silicon Nitride, in Proceedings of 4th internat. Symp. of Ceramic Material and Components for Engines, Göteborg 1991) by the total additive content being reduced and the $Y_2O_3$:$Al_2O_3$ ratio being lowered to 2.

The flexural breaking strength of the sample in Example 4 is 800 MPa at 1000° C. Furthermore, these samples have a high $K_{IC}$ value of 10.5·√m MPa. The individual features of the structure are shown in Table 2.

Besides $Si_3N_4$ there is an amorphous grain boundary phase. The exceptionally good high-temperature properties were achieved by the selection of suitable additive ratios and the use of a customized gas-pressure sintering program, which lead to the formation of the structure of the invention.

Examples 6, 7 and 8

To vary the total amount of additive while maintaining a constant $Y_2O_3$/$Al_2O_3$ ratio, powder mixtures of $Si_3N_4$ (98% of $\alpha$-$Si_3N_4$ and 2% of $\beta$-$Si_3N_4$, $O_2$ content of <1.5% by weight; BET=11 m²/g) having different total contents but a constant ratio of $Y_2O_3$ to $Al_2O_3$=2 are prepared. In addition, to change the liquid phase (viscosity) during sintering, 0.2% by weight of $ZrO_2$ or 0.4% by weight of $HfO_2$ and, for comparison, 0.2% by weight of CaO were added.

|  | Addition to glass phase | Total additive content |
| --- | --- | --- |
| Example 6 | 0.2% by weight CaO | 6.0% by weight |
| Example 4 (invention) | — | 8.0% by weight |
| Example 7 (invention) | 0.4% by weight $HfO_2$ | 10.4% by weight |
| Example 8 (invention) | 0.2% by weight $ZrO_2$ | 12.5% by weight |

As described in Examples 1 and 2, the samples were mixed, milled, dried and pressed to give shaped parts and sintered under gas pressure. The results are summarized in Table 3. Sufficiently good compaction was not achieved in Example 6; this means that with the selected compositions and gas-pressure sintering conditions sufficient compaction to guarantee good strength could not be achieved. For the low additive content of 6% by weight, therefore, other compaction conditions must be selected. The addition of $HfO_2$ (Example 7) with a somewhat increased total additive content has led to both excellent compaction and to very good high-temperature properties and gave 869 MPa at 1000° C. The sample was also distinguished by the $Si_3N_4$ being present in both the $\alpha$ and the $\beta$ forms. $HfO_2$ is present in solution in the glass phase, since no hafnium-containing crystalline phase in addition to $Si_3N_4$ could be indentified in the X-ray diffraction spectrum. The addition of $ZrO_2$ (Example 8) also leads to good high-temperature properties.

TABLE 1

| Composition, sintering conditions and results for the prior art | | |
| --- | --- | --- |
| Example | No. 1 | No. 2 |
| Composition [% by weight] | | |
| $Si_3N_4$ | 87.71 | 87.71 |
| $Al_2O_3$ | 2.28 | 2.28 |
| $Y_2O_3$ | 10.01 | 10.01 |
| Total additive content | 12.29 | 12.29 |
| $Y_2O_3$/$Al_2O_3$ | 4.4 | 4.4 |
| Sintering conditions | | |
| Temperature [°C.] | 1800 | 1750 |
| $N_2$ pressure [MPa] | 0.1 | 2 |
| Holding time [h] | 1 | 0.5 |

TABLE 1-continued

Composition, sintering conditions and results for the prior art

| Example | No. 1 | No. 2 |
|---|---|---|
| Density [% of theoretical density] | 98.5 | 98.9 |
| Crystalline phase composition | β-$Si_3N_4$ | β-$Si_3N_4$ |
| Flexural breaking strength* [MPa] | | |
| at 25° C.[1) | 720 | 771 |
| at 1000° C.[2) | 545 | 699 |
| Fracture toughness $K_{IC}$ [MPa·√m] | 9.2 | 10.1 |
| Microstructural parameters: | | |
| Aspect ratio | 6.0 | 7.5 |
| Number of grains per unit Area [$10^6$/mm$^2$] | 1.0 | 4.0 |
| Average grain width [μm] | 0.6 | 0.5 |

*The flexural breaking strength was determined in accordance with DIN 51 110
$K_{IC}$: was determined by the notched beam method in accordance with DIN 51 109 (notch depth = ⅓ of the specimen thickness)
[1)average of at least 6 measured values
[2)average of at least 3 measured values

TABLE 2

Composition, sintering conditions and results for Examples 3 to 5

| Example | No. 3 | No. 4 | No. 5 |
|---|---|---|---|
| Composition [% by weight] | | | |
| $Si_3N_4$ | 89.95 | 92.00 | 94.00 |
| $Al_2O_3$ | 2.28 | 2.67 | 3.00 |
| $Y_2O_3$ | 7.77 | 5.33 | 3.00 |
| Total additive content | 10.00 | 8.00 | 6.00 |
| $Y_2O_3/Al_2O_3$ | 3.5 | 2.0 | 1.0 |
| Sintering conditions | | | |
| Temperature [°C.] | 1800 | 1725 | 1850 |
| $N_2$ pressure [MPa] | 2 | 8 | 8 |
| Holding time [h] | 1.5 | 1.5 | 0.5 |
| Density [% of theoretical density] | 94.6 | 99.99 | 97.9 |
| Crystalline phase composition | β-$Si_3N_4$ | β-$Si_3N_4$ | β-$Si_3N_4$ |
| Flexural breaking strength* [MPa] | | | |
| at 25° C.[1) | 798 | 983 | 724 |
| at 1000° C.[2) | 601 | 800 | 579 |
| Fracture toughness $K_{IC}$ [MPa·√m] | 8.9 | 10.5 | 8.2 |
| Microstructural parameters: | | | |
| Aspect ratio | 8.0 | 9.7 | 8.5 |
| Number of grains [$10^6$/mm$^2$] | 2.0 | 4.5 | 3.5 |
| Average grain width [μm] | 0.5 | 0.2 | 0.3 |

*The flexural breaking strength was determined in accordance with DIN 51 110
$K_{IC}$: was determined by the notched beam method in accordance with DIN 51 109 (notch depth = ⅓ of the specimen thickness)
[1)average of at least 6 measured values
[2)average of at least 3 measured values

TABLE 3

Composition, sintering conditions and results for Examples 6 to 8

| Example | No. 6 | No. 7 | No. 8 |
|---|---|---|---|
| Composition [% by weight] | | | |
| $Si_3N_4$ | 93.80 | 89.61 | 87.51 |
| $Al_2O_3$ | 2.00 | 3.33 | 4.10 |
| $Y_2O_3$ | 4.00 | 6.66 | 8.20 |
| Addition | 0.2 CaO | 0.4 $HfO_2$ | 0.2 $ZrO_2$ |
| Total additive content | 6.2 | 10.4 | 12.5 |
| $Y_2O_3/Al_2O_3$ | 2.0 | 2.0 | 2.0 |
| Sintering conditions | | | |
| Temperature [°C.] | 1800 | 1750 | 1850 |
| $N_2$ pressure [MPa] | 2 | 8 | 2 |
| Holding time (h) | 0.5 | 0.5 | 1.5 |
| Density [% of theoretical density] | 92.0 | 99.1 | 98.5 |
| Crystalline phase composition | β-$Si_3N_4$ | 11% β-$Si_3N_4$ 89% β-$Si_3N_4$ | β-$Si_3N_4$ |
| Flexural breaking strength* [MPa] | | | |
| at 25° C.[1) | 707 | 1045 | 853 |
| at 1000° C.[2) | 566 | 869 | 805 |
| Fracture toughness $K_{IC}$ [MPa·√m] | 7.6 | 9.5 | 10.0 |
| Microstructural parameters: | | | |
| Aspect ratio | 7.5 | 12.2 | 11.5 |
| Number of grains [$10^6$/mm$^2$] | 4.0 | 6.1 | 5.0 |
| Average grain width [μm] | 0.45 | 0.15 | 0.25 |

*The flexural breaking strength was determined in accordance with DIN 51 110
$K_{IC}$: was determined by the notched beam method in accordance with DIN 51 109 (notch depth = ⅓ of the specimen thickness)
[1)average of at least 6 measured values
[2)average of at least 3 measured values

What is claimed is:

1. A shaped part of sintered silicon nitride ceramic having high mechanical strength consisting essentially of at least 87% by weight $Si_3N_4$ having crystalline phases of the α- and/or β-form, from 5 to 13% by weight of an additive combination of $Al_2O_3$ and $Y_2O_3$, with a $Y_2O_3/Al_2O_3$ weight ratio being in a range of from 1.1 to 3.4, and additionally from 0 to 1.0% by weight of $HfO_2$ and/or $ZrO_2$, wherein the shaped part has a density of greater than 98% of the theoretically possible density and its bending strength is >850 MPa at room temperature and ≧800 MPa at a temperature of 800° C.

2. Shaped part as claimed in claim 1, having a fracture toughness $K_{IC}$ of ≧8 MPa·√m.

3. Shaped part as claimed in claim 1, wherein the silicon nitride ceramic has a number of grains per unit area of greater than 3·$10^6$ grains/mm$^2$.

4. Shaped part as claimed in claim 3, wherein the grains have an average grain width of ≦0.4 μm.

5. Shaped part as claimed in claim 4, wherein the grains have a maximum grain width of ≦2 μm.

6. Shaped part as claimed in claim 4, wherein the grains have an aspect ratio of ≧8.

7. Shaped part as claimed in claim 5, wherein the grains have an aspect ratio of ≧8.

8. Shaped part as claimed in claim 1, having an amorphous grain boundary phase between the $Si_3N_4$ grains with a maximum thickness of 0.1 μm.

9. Shaped part as claimed in claim 1, having a fracture toughness $K_{IC}$ of greater than 9 MPa·$\sqrt{m}$.

10. Shaped part as claimed in claim 1, having a mechanical flexural breaking strength at room temperature of $\geq 950$ MPa.

11. A shaped part as claimed in claim 1, having a modulus of elasticity in the range of from 290 to 320 GPa.

12. A shaped part as claimed in claim 1, having a coefficient of thermal expansion of $3.1 \times 10^{-6}$/K and a thermal conductivity of 20 W/m·K.

13. A shaped part as claimed in claim 1, wherein the $Y_2O_3/Al_2O_3$ weight ratio is 2.0.

14. A shaped part as claimed in claim 1, having 0.4 to 1% by weight $HfO_2$.

15. A shaped part as claimed in claim 1, having 0.2 to 1% by weight of $ZrO_2$.

* * * * *

UNITED STATES PATENT AND TRADEMARK OFFICE
CERTIFICATE OF CORRECTION

PATENT NO. : 5,556,815
DATED : September 17, 1996
INVENTOR(S) : BOBERSKI et al.

It is certified that error appears in the above-indentified patent and that said Letters Patent is hereby corrected as shown below:

Column 2, line 39, delete "3.106 grains/mm$^2$" and insert insert --3·10$^6$ grains/mm$^2$--;

Column 3, line 18, delete "β from" and insert --β-form--.

Signed and Sealed this

Twenty-ninth Day of April, 1997

BRUCE LEHMAN

Attest:

Attesting Officer

Commissioner of Patents and Trademarks